(12) United States Patent
Lockhart et al.

(10) Patent No.: US 6,393,565 B1
(45) Date of Patent: May 21, 2002

(54) DATA MANAGEMENT SYSTEM AND METHOD FOR A LIMITED CAPACITY CRYPTOGRAPHIC STORAGE UNIT

(75) Inventors: Roland T. Lockhart, Kanata; Michael J. Wiener, Nepean, both of (CA)

(73) Assignee: Entrust Technologies Limited, Ottawa (CA)

( * ) Notice: Subject to any disclaimer, the term of this patent is extended or adjusted under 35 U.S.C. 154(b) by 0 days.

(21) Appl. No.: 09/128,321

(22) Filed: Aug. 3, 1998

(51) Int. Cl.[7] ............................................. G06F 01/24
(52) U.S. Cl. .................... 713/172; 713/185; 380/277
(58) Field of Search ............................... 713/172, 185; 380/277, 278

(56) References Cited

U.S. PATENT DOCUMENTS

| 4,972,472 A | * 11/1990 | Brown et al. ................. 380/21 |
| 5,442,704 A | * 8/1995 | Holtey ......................... 380/23 |
| 5,987,489 A | * 11/1999 | Monier ....................... 708/523 |

OTHER PUBLICATIONS

Menezes et al, "Handbook of Applied Cryptography", CRC Press, Oct. 17, 1996.*
Rankl et al, "Smart Card Handbook", 1997, Wiley & Sons, general disclusure.*
Simmons et al, "Contempory Cryptology", 1992, IEEE Press, general disclosure.*
Luis Zoreda et al, "Smart Cards", 1994, Artech House Inc, general disclosure.*
Hendry, "Smart Card Security and Applications", 1997, Artech House Inc, general disclosure.*

* cited by examiner

Primary Examiner—Thomas R. Peeso
(74) Attorney, Agent, or Firm—Vedder, Price, Kaufman & Kammholz

(57) ABSTRACT

A data management system and method for a limited cryptographic storage unit, such as a smartcard or other hardware token, includes a cryptographic data manager that interfaces with the limited capacity cryptographic storage unit and a data overflow memory coupled to the cryptographic data manager. The cryptographic data manager stores cryptographic data, such as decryption private keys or other secret cryptographic data, in the overflow memory from the limited capacity cryptographic storage unit based on a limited capacity storage unit data update condition. The cryptographic data manager may serve as a secondary cryptographic data manager that receives the cryptographic data from an original cryptographic data storage device, or primary storage device such as a server that generates the cryptographic data, that stores a history of the cryptographic data.

49 Claims, 8 Drawing Sheets

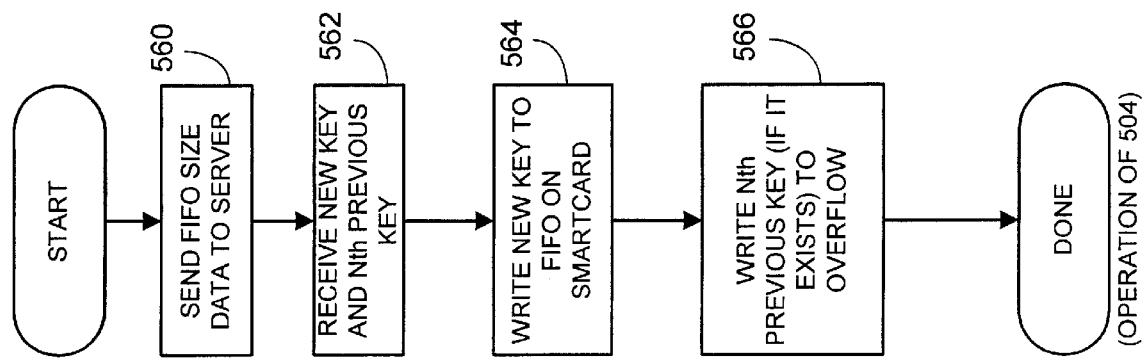
FIG. 5b
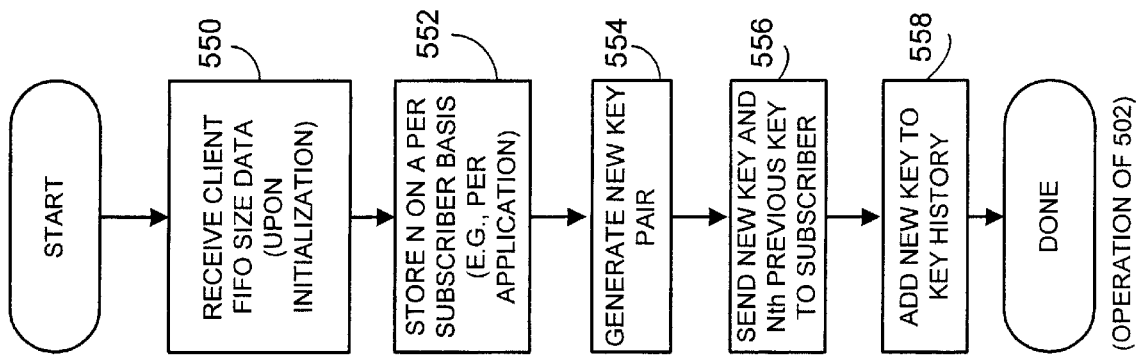

DATA MANAGEMENT SYSTEM AND METHOD FOR A LIMITED CAPACITY CRYPTOGRAPHIC STORAGE UNIT

FIELD OF INVENTION

The invention relates generally to systems that employ cryptographic key history data and more particularly to systems that employ cryptographic history data wherein some of the key history data is stored on a limited capacity memory device, such as a portable storage device.

BACKGROUND OF THE INVENTION

Cryptographic systems are known that employ the storage of cryptographic key history data, such as decryption private key history data in a public/private key pair system. The decryption private key history data is physically stored in a secure database, or other medium so that a user who has obtained encrypted information using a previous public key of a public/private encryption key pair, can decrypt older messages. It is known in the art to generate additional private keys when the life time of an encryption public key of the public/private key pair has expired or has been revoked due to a detected compromise or some other condition. A key pair generating mechanism, for example, a secure server, may generate a new public/private encryption key pair upon notification of a lifetime expiration of the private encryption key or public encryption key. Hence, in a public key cryptography system a secure authority generates encryption key pairs and sends the new encryption key pair to a subscriber when a subscriber's key pair expires. This may occur quite frequently, such as every several months depending upon the level of security required in the given system.

In many cryptographic systems, hardware tokens such as smartcards are employed which contain the private decryption key of a public key pair to store the secret key in a secure storage location. A subscriber then may keep the smartcard on their person to ensure that an attacker cannot obtain the secret private decryption key information. However, a problem arises with conventional hardware tokens because they typically have limited storage capabilities and cannot store large private key histories. Consequently, when a subscriber having the hardware token wishes to decrypt all of their messages using their smartcard, they are unable to encrypt some older messages since the smartcard cannot hold enough key history data to accommodate all pertinent expired or revoked decryption keys. Conventional hardware tokens typically have their memory configured such that once the memory is filled to capacity, no additional decryption private keys can be stored. Such systems do not typically allow overwrites or additional updates after the memory is full. As such, the subscriber has no access to the full key history information to allow use of older encrypted documents. Therefore, in current systems, the cryptographic system simply rejects the key history update process when the memory on the hardware token is filled. This typically results in the subscriber having to buy a more expensive hardware token containing larger memory storage capabilities or prevents the subscriber from decrypting older messages.

Consequently, there exists a need for a data management system for a limited capacity cryptographic storage unit that can detect when the storage unit can no longer accommodate additional cryptographic data. It would be advantageous if such a system could detect a cryptographic data overflow condition of a limited capacity storage unit and maintain data storage for information useful to the subscriber without requiring additional memory added to the limited capacity device.

BRIEF DESCRIPTION OF THE DRAWINGS

FIG. 4b is a flowchart illustrating the operation of the system shown in FIG. 4a;

FIG. 5b is a flowchart illustrating the operation of the system shown in FIG. 5a.

DETAILED DESCRIPTION OF THE INVENTION

A data management system and method for a limited cryptographic storage unit, such as a smartcard or other hardware token, includes a cryptographic data manager that interfaces with the limited capacity cryptographic storage unit and data overflow memory. The cryptographic data manager stores cryptographic data, such as decryption private keys or other secret cryptographic data, in the overflow memory from the limited capacity cryptographic storage unit based on a limited capacity storage unit data update condition. In another embodiment, the cryptographic data manager determines whether there is sufficient room on the limited capacity storage device and obtains or removes cryptographic data from the limited capacity storage device and stores it in overflow memory.

The cryptographic data manager may serve as a secondary cryptographic data manager that receives the cryptographic data from an original cryptographic data storage device. The original or primary cryptographic data storage device may be a server that generates the cryptographic data and stores a history of the cryptographic data. Where the cryptographic data manager is employed in a public key cryptography system, the cryptographic data manager serves as a key history manager of decryption private keys, or other key data, and the original key history storage device stores a complete set of key history data for a given subscriber. A system and method in one embodiment, transfers the oldest cryptographic data, such as the oldest decryption private key data to the data overflow device, such as into a file on a computer disk, and may encrypt the data using an encryption key stored on the limited capacity cryptographic storage unit.

In one embodiment, the cryptographic data manager determines the limited capacity storage unit data update condition based on a detection of a data overflow condition for the limited capacity storage unit. In other embodiment, the update condition is based on an indication that new data is to be stored on the limited capacity cryptographic storage unit. The cryptographic data manager stores decryption private key history for example in the data overflow storage device in response to generation of a new decryption private key.

In one embodiment, the limited capacity cryptographic storage unit is configured as a FIFO (first in, first out) cryptographic storage device such that the oldest cryptographic data is removed upon the writing of a more recent cryptographic data, such as a most recent expired decryption private key. The limited capacity storage unit may store redundant cryptographic data in the overflow storage memory and/or may only store non-redundant cryptographic data in the data overflow storage device. In this way, the system allows some redundant storage cryptographic data in the smartcard and in overflow memory when new cryptographic data must be stored on the smartcard.

Figure 1A:
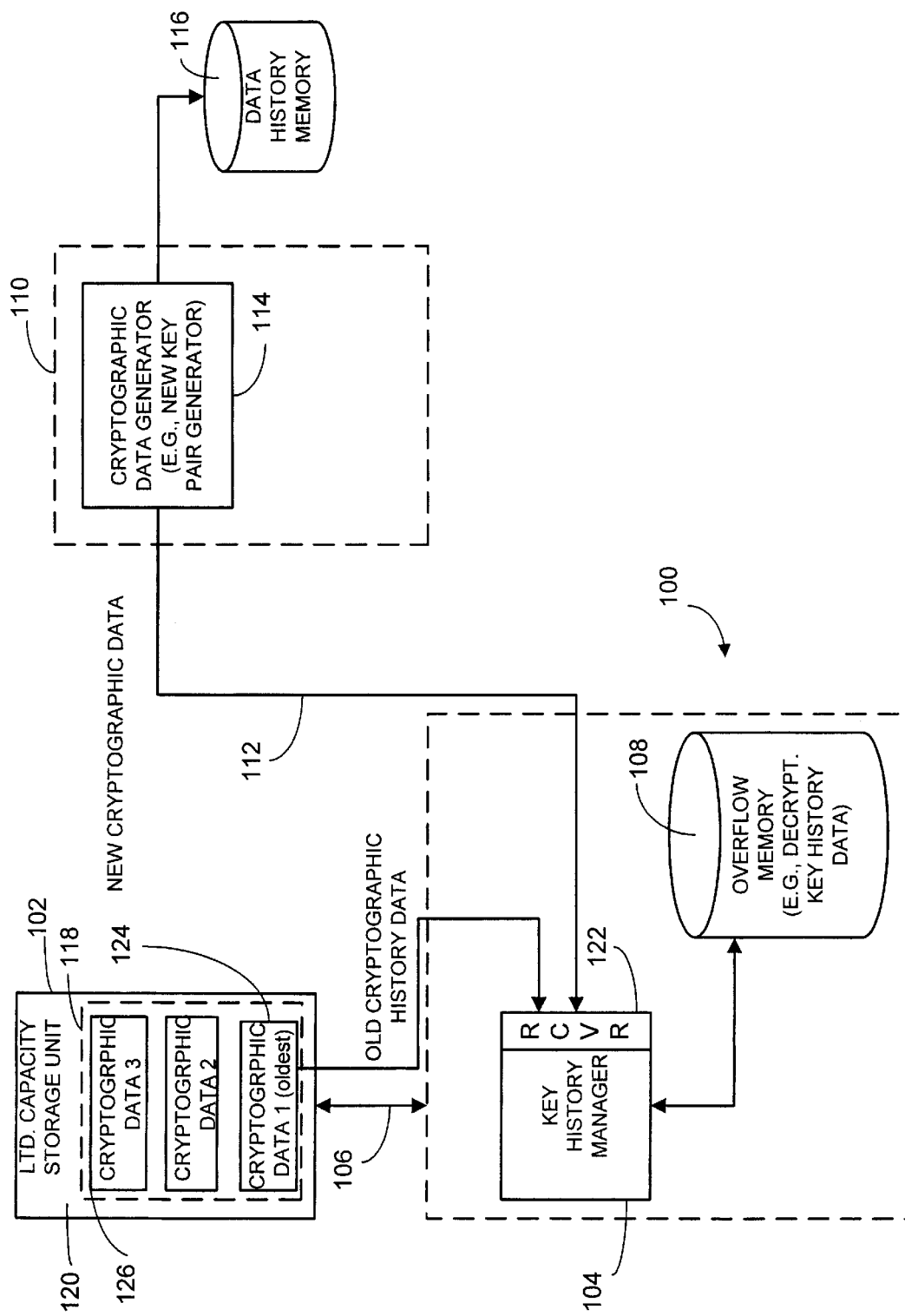
FIG. 1a is a block diagram generally illustrating one embodiment of a data management system for a limited capacity cryptographic storage unit in accordance with the invention.

FIG. 1a shows a data management system 100 for a limited capacity cryptographic storage unit 102, such as a smartcard or other hardware token. The data management system 100 includes a cryptographic data manager 104 that interfaces with the limited capacity cryptographic storage unit 102 through a suitable communication link 106. The communication link 106 may be a secure link or physical connection to prevent an attacker from obtaining information from the link. Alternatively, the information passed over the link 106 may be suitably encrypted so that the link 106 may be unsecure. The data management system 100 also includes data overflow memory 108 which receives overflow cryptographic data from the cryptographic data manager 104. The cryptographic data manager stores cryptographic data, such as decryption private key history data, in the data overflow memory 108 obtained from the limited capacity storage unit 102 based on a cryptographic data update condition for the limited capacity storage device 102.

For purposes of illustration only, the data management system will be described with reference to a public key cryptographic system. However it will be recognized by one of ordinary skill in the art, that the disclosed system may be applicable to any suitable cryptographic system. A new (original) cryptographic data generator 110, such as a secure decryption private key generator, is coupled to the cryptographic data manager 104 through a suitable secure link 112. The new cryptographic data generator 110 may be for example a server that has a public/private key pair generator 114 for generating new public/private encryption key pairs when previous key pairs are needed by the subscriber. The new cryptographic data generator 110 stores a history of the revoked or retired data, such as the decryption private key history for a number of subscribers. The decryption private key history data is securely stored in memory 116.

The limited capacity cryptographic storage unit 102 may be a smartcard or other hardware token as known in the art, that includes some processing capability and memory 118. The limited storage unit 102 stores a number of cryptographic data entries generally indicated at 120, such as a number of decryption private keys for the subscriber associated with the hardware token. The limited capacity cryptographic storage unit 102 can only store a fixed number of cryptographic entries. A cryptographic data manager 104 may also include a receiver 122, such as a modem, which receives the new cryptographic data that is generated by the cryptographic data generator 110 and stores the most recent cryptographic data in a smartcard entry. The cryptographic data manager 104 obtains the oldest cryptographic data stored in the entry 124 and stores the data removed from the smartcard into overflow memory 108. By way of example, when a new decryption private key is generated by the key pair generator 114, the new decryption private key is sent over communication link 112 to receiver 122. The cryptographic data manager 104, serving as a decryption key history manager, communicates with the smartcard to obtain the oldest decryption private key stored on the smartcard through receiver 122. The decryption key history manager stores the old key in the overflow memory 108 and stores the newly generated key received from data generator 110 into another location such as entry 126 in the smartcard. The cryptographic data manager 104 may be a software module running on a computer such as an IBM PC computer.

Figure 1B:
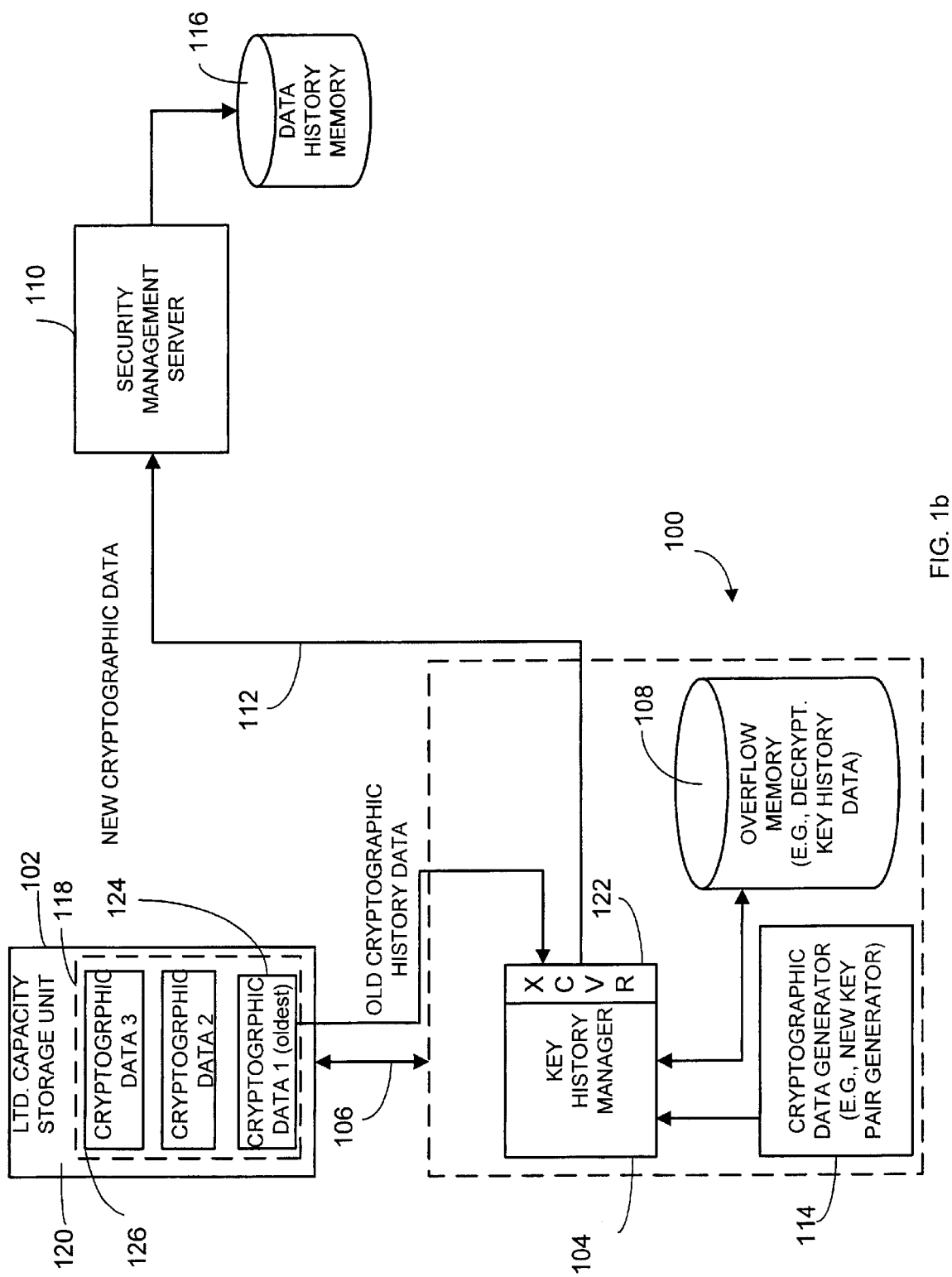
FIG. 1b is an alternate embodiment of a data management system for a limited capacity cryptographic storage unit in accordance with the invention.

FIG. 1b shows an alternative embodiment to the data management system of FIG. 1a in that the new cryptographic data generation is performed in the same computer containing the cryptographic data manager. As such, when the invention is applied to a public key cryptography system, a public/private key pair generator 114 may be located in the unit containing the key decryption key history manager (104). The server 110 in this embodiment receives the new decryption private key from the decryption key history manager through a transceiver 122 and stores the new decryption private key as key history data in memory 116 so that an original or primary key history is maintained. The cryptographic data manager then controls data overflow as previously described with reference to FIG. 1a.

Figure 2:
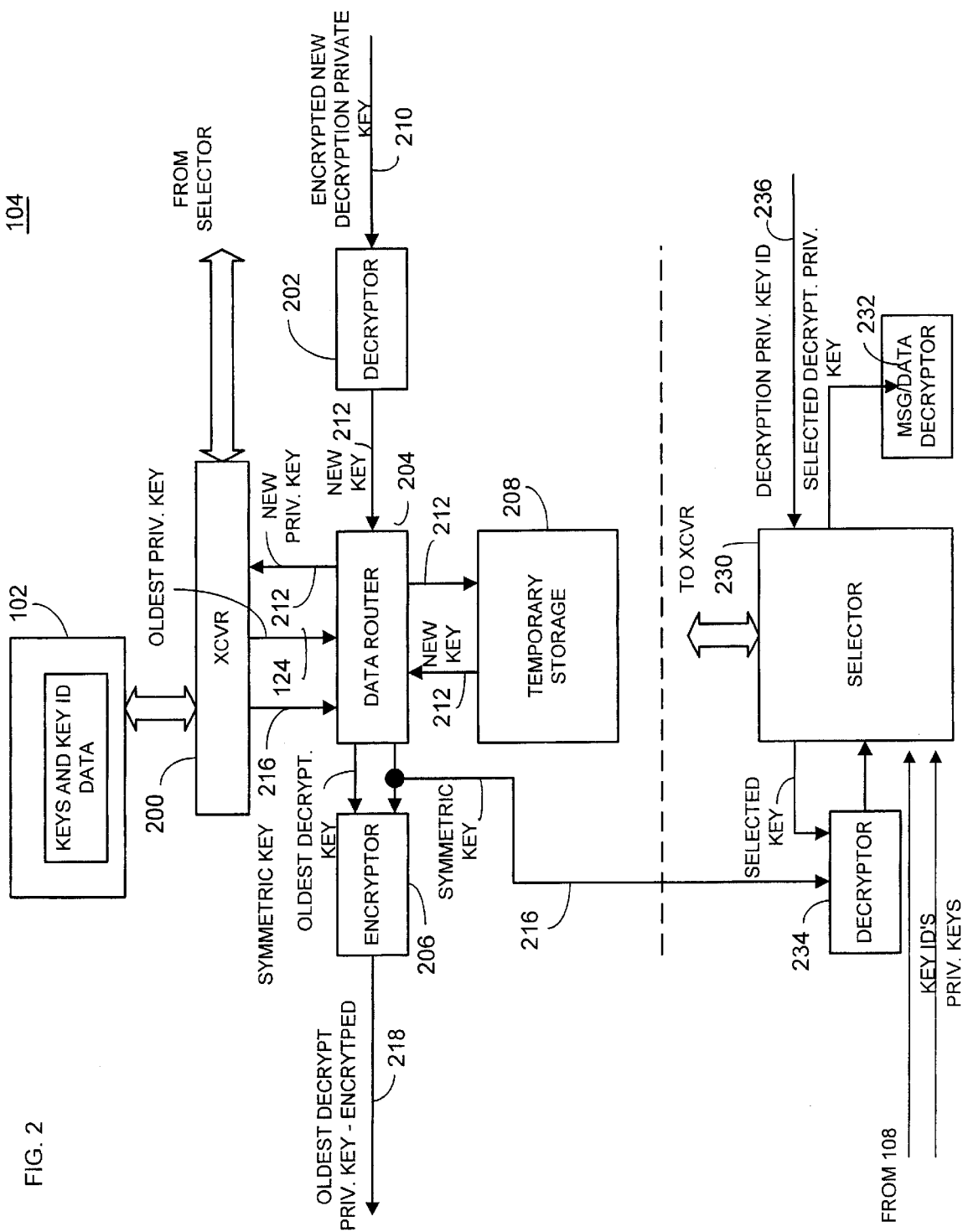
FIG. 2 is a block diagram illustrating in more detail one embodiment of a data management system for a limited capacity cryptographic storage unit in accordance with the invention.

FIG. 2 is a more detailed block diagram of a cryptographic data manager 104 employed in a public key cryptography system. The cryptographic data manager 104 is configured as a decryption key history manager. The cryptographic data manager 104 includes a transceiver 200 to communicate information to and from the limited capacity cryptographic storage unit 102 which in this embodiment is a smartcard. The smartcard contains decryption private key data and key identification data corresponding to each decryption private key as known in the art. The cryptographic data manager 104 also includes a decryptor 202 that receives encrypted new decryption private key data or other new cryptographic data from a cryptographic data generator. The cryptographic data manager 104 also includes a data router 204, an encryptor 206 that is coupled to the overflow memory 108, and temporary key storage memory 208 coupled to the router 204.

Figure 3:
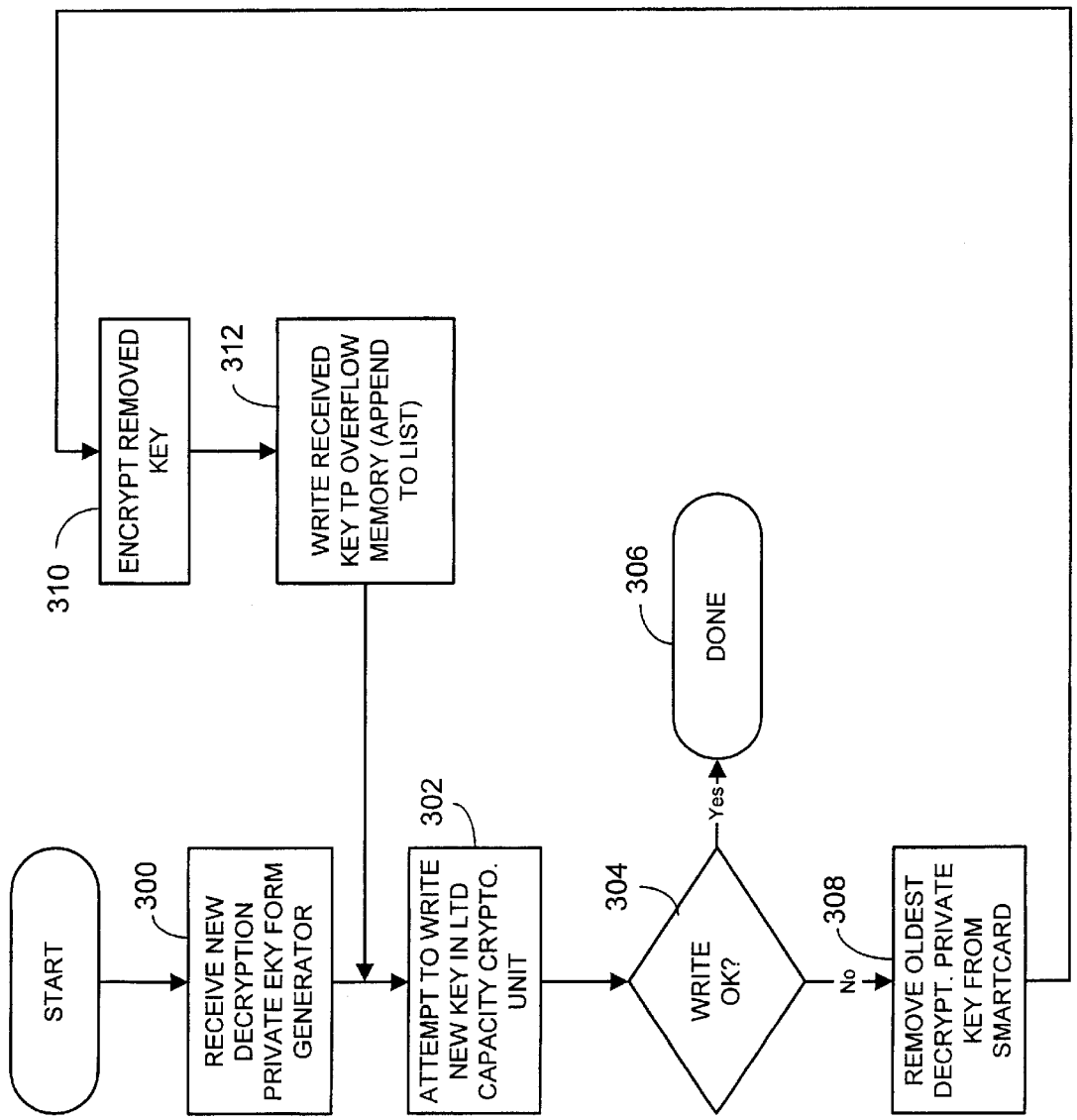
FIG. 3 is a flowchart generally illustrating the operation of a key history manager based on the system shown in FIG. 1.

Referring to FIGS. 2 and 3, the cryptographic data manager 104 receives encrypted new decryption private key data 210 from a key pair generator either within the same computer containing the cryptographic data manager, from another server such as a security server 110 or from another source. The encrypted new decryption key pairs are generated by the key pair generator due to an expiry of an encryption public key certificate or a revocation of a certificate as known in the art. This is shown in block 300. The decryptor 202 decrypts the encrypted new decryption private key using a shared symmetric decryption process such as a CAST process, DES process or other suitable decryption process. The result is a decrypted new decryption private key 212. The data router 204 receives the new decryption private key and attempts to write the new key to the smartcard as shown in block 302. If the write is successful, the cryptographic data manager is done as shown in blocks 304 and 306. If the write was unsuccessful, meaning that there was not enough memory in the smartcard, the data router 204 removes the oldest decryption private key from the smartcard as shown in block 308. The oldest decryption private key 124 is received from the smartcard through transceiver 200. The smartcard 102 also transfers a symmetric key 216 along with the oldest decryption private key 124 to the data router 204.

The symmetric key 216 and the oldest decryption key 124 are sent to encryptor 206 where the oldest decryption key that has been removed is encrypted under the symmetric key 216 held by the smartcard. This is shown in block 310. The oldest decryption private key encrypted under the symmetric key 216 (shown as data 218) is stored in the overflow memory 108 as shown in block 312. As used herein, the oldest decryption private key also includes the corresponding key I.D. data associated therewith.

If the data router 204 is unable to write the new private decryption key 212 on to the smartcard 102, the data router 204 temporarily stores the new decryption private key 212 in the temporary storage 208 until the key can be written to the smartcard. As such, the data router 204 determines the smartcard update condition when it is unable to write the new private key 212 onto the smartcard by determining that the written data would overflow if not properly managed. In this instance, the update condition is a condition where new data, namely a new decryption private key, is to be stored in the limited capacity cryptographic storage unit 102. Also in this embodiment, the cryptographic data manager 104 manages decryption private key storage namely, decryption private key history data among the limited capacity storage unit 102 or smartcard and the data overflow storage device, such that no key history data is lost upon the generation of a new decryption private key even though the smartcard memory is at capacity. In this embodiment, the cryptographic data manager 104 stores decryption private key history data in the data overflow memory 108 in response to generation of a new decryption private key. Also, the smartcard includes enough memory to store at least two private decryption keys so that at least a portion of the total private decryption key history is stored in the limited capacity storage device and/or a portion of the key history data is also stored in the overflow memory 108.

In this embodiment, the oldest decryption private key history data entry stored in the smartcard is removed and stored in the overflow memory for later recovery if desired. Therefore no redundant decryption private key history data is stored in both the limited capacity cryptographic storage device 102 and the overflow memory. However, it will be recognized by those of ordinary skill in the art, that if desired one or more entries of information may be duplicated in both the smartcard and the overflow memory depending upon the particular application.

As previously discussed, the data router 204 routes the new cryptographic data, such as a new decryption private key to the limited capacity cryptographic storage unit 102. The encryptor 206 encrypts data sent to the overflow storage memory 108 whereas the decryptor 202 decrypts the new data prior to being stored in the limited capacity cryptographic storage unit.

Each of the limited capacity cryptographic storage unit 102 and the overflow storage memory 108 stores cryptographic key identification data, such as decryption private key identification data corresponding to decryption private keys. Also, it will also be recognized that although the symmetric key 216 may be obtained from the smartcard, the symmetric key or other encryption key may be obtained from any other source if desired.

Also shown in FIG. 2, as part of the cryptographic data manager 104, is a selector 230, a message or document decryptor 232 and cryptographic data decryptor 234. These elements are used by the cryptographic data manager 104 to decrypt old messages or data that was encrypted using an expired public key corresponding to a decryption private key in the key history data stored either in the smartcard or in the overflow memory. The selector 230 receives decryption private key identification data 236 from encrypted message data or other source as known in the art. Such decryption private key identification (I.D.) data is typically attached to the encrypted information. The selector 230 requests key identification data from the limited storage capacity unit 102 through transceiver 210 to determine whether the received decryption private key I.D. 236 matches key I.D. data stored on the smartcard. If the smartcard contains the matching decryption private key I.D. to that received, the selector obtains the associated decryption private key and sends it to the message/data decryptor 232 so that the old message/data may be decrypted and read by a subscriber.

If the selector 230 determines that the decryption private key I.D. is not present on the smartcard, the selector 230 then obtains all the key I.D.s from the overflow memory 108 and checks to see if the matching decryption private key I.D. is present on the overflow memory. If present, the selector obtains the associated private key along with the symmetric key 216 and passes the private key to the decryptor 234 to decrypt the previously encrypted old decryption private key. The decrypted private key is then sent as the selected decryption private key to the message or document decryptor 232.

Figure 4A:
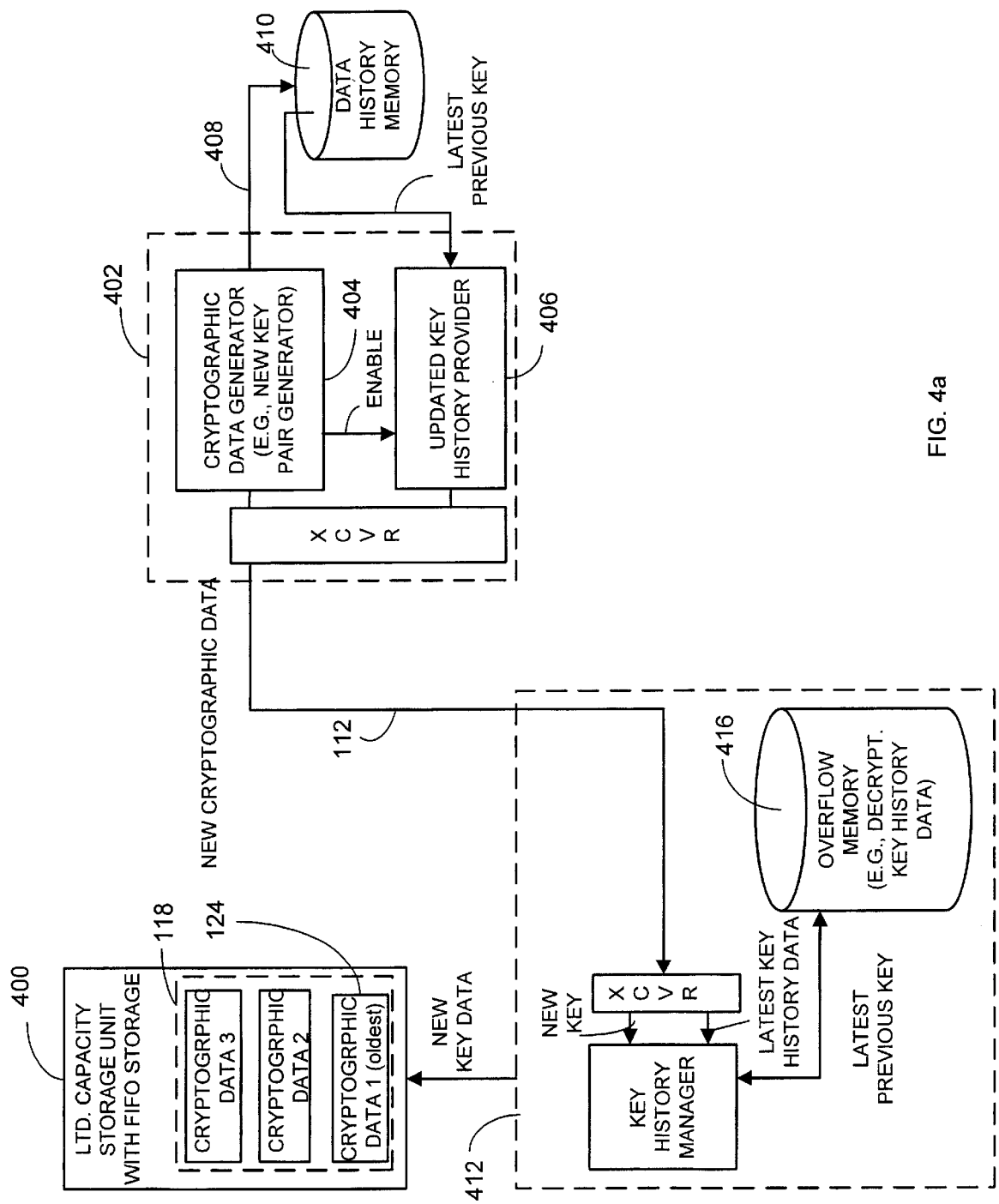
FIG. 4a is an alternative embodiment of a data management system for a limited capacity cryptographic storage unit in accordance with the invention.

FIG. 4a is an alternative embodiment utilizing a first in first out (FIFO) decryption key storage configuration in the smartcard 102. In addition, the system employs a redundancy of keys in the smartcard and in the overflow memory. In this embodiment the cryptographic data manager 412 does not obtain an oldest decryption private key from the smartcard but merely overwrites it in a FIFO manner. The most recently expired key (latest previous private key or groups of old keys if desired) is received from the cryptographic data generator 402 and is stored in the overflow memory 416. The overflow memory 416 is updated with the most recently expired key and continues to be updated to store the entire key history (or subset if desired). The smartcard still includes some old keys (key history data) that are redundant with those on the memory 416. This embodiment can afford some reduced communication overhead since only a latest previous key or most recent key in the key history is communicated to the cryptographic data manager and subsequently stored in both the smartcard and the latest previous key or overflow memory. As such, the key history manager or cryptographic data manager 412 need not temporarily store the new key to wait until it can be stored on the smartcard but instead simply utilizes the smartcard's FIFO storage arrangement to override a previous key that was part of a decryption private key history data.

As shown, the limited capacity cryptographic storage unit 400 stores its data in a FIFO manner. The data generator 402 includes a public key pair generator 404 and updated key history provider 406. The key pair generator generates the new key pair as previously described in response to a revoked certificate or expired certificate. The new current key 408 is stored as part of key history data, in the memory 410. The memory 410 includes the entire key history data including the current key. The updated key history provider 406 obtains the latest previous key or most recently rescinded cryptographic data and transmits the information to the cryptographic data manager 412. Likewise the key pair generator 404 sends the new cryptographic data to the cryptographic data manager 412 over link 112.

Figure 4B:
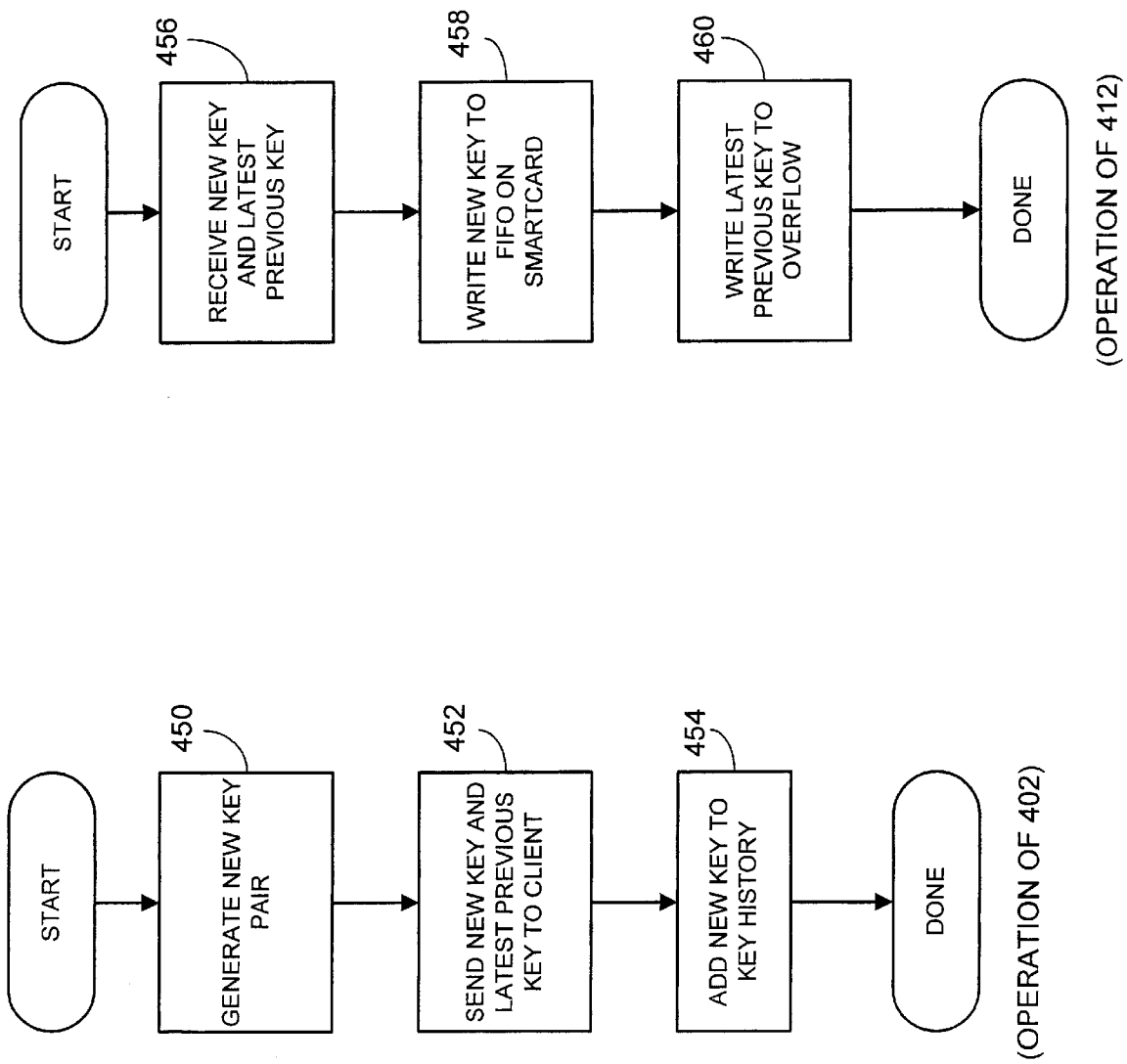

Referring also to FIG. 4b, the key pair generator 404 generates the new key pair as shown in block 450. The server or data generator 402 sends the new key and the latest previous key to the node containing the cryptographic data manager 412 as shown in block 452. The key pair generator then adds the new key to the key history memory 410 as shown in block 454. The cryptographic data manager receives the new key and the latest previous key as shown in block 456. The cryptographic data manager then writes the new decryption private key to the FIFO memory on the smartcard as shown in block 458. The cryptographic data manager also writes the latest previous key received from the updated key history provider 406 to the overflow memory 416. The overflow memory 416 does not include the most current decryption private key. This information is only stored on the smartcard to maintain effective security.

Figure 5A:
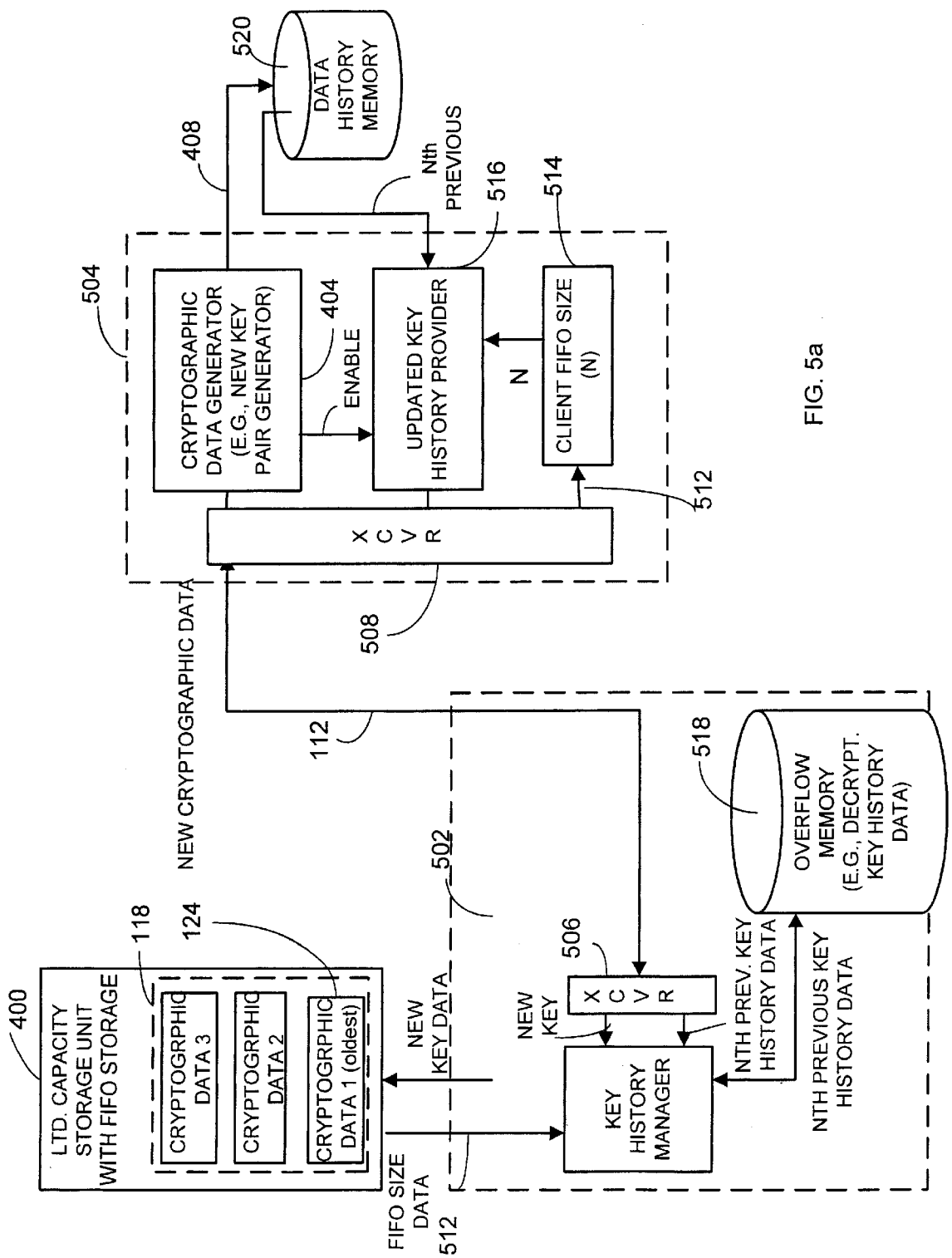
FIG. 5a is an alternative embodiment of the data management system for a limited capacity cryptographic storage unit in accordance with the invention.

FIG. 5a is a block diagram depicting another embodiment of a data management system 500 wherein there is no redundancy between the cryptographic data on the smartcard and that in the overflow memory, in contrast with the system shown in FIG. 4a which includes redundancy of the latest previous key in both the smartcard or limited storage memory in the overflow memory. In contrast with the system in FIG. 4a, the data management system 500 includes a cryptographic data manager 502 that obtains the FIFO size of the limited storage device 400. The cryptographic data manager sends and receives information with the data generator 504 through transceiver 506. Likewise, the data generator 504 includes a transceiver 508 to facilitate bi-directional communication with the cryptographic data manager 502. The cryptographic data manager 502 queries the smartcard and determines the FIFO size and obtains FIFO size data 512 and communicates this information back to the data generator 504 for storage in a FIFO size register 514. An updated key history provider 516 uses the FIFO size data N to determine which old encryption private key should be sent to the overflow memory 518. The overflow memory 518 includes old decryption keys or other cryptographic data but does not include the current decryption private key and does not include the old keys stored in the smartcard. Only the key overwritten in the smartcard is stored in the overflow memory.

The operation of the system 500 is shown in FIG. 5b. In operation, the data generator 504 receives FIFO memory size data 512, as shown in block 550. It stores this information on a per client or per subscriber basis in the client FIFO size register 514 as shown in block 552. The key pair generator 404 generates the new key pair as shown in block 554. The key pair generator 404 then sends the new key and the updated key history provider 516 obtains the Nth previous key (the key deleted from the smartcard when the new key is stored therein) from key history memory 520, then sends the previous key if one exists, to the limited capacity cryptographic data manager 502 as shown in block 556. As shown in block 558, the cryptographic data generator 504 adds the newly generated key to its key history in memory 520.

From the data manager's point of view, as shown in block 560, it sends the FIFO size data 512 as obtained from the smartcard to the data generator 504 so that the generator 504 can determine which old key to send back. The cryptographic data manager 502 receives the new key and the previous Nth key via transceiver 506. This is shown in block 562. In block 564, the data manager writes the new key to the FIFO on the limited capacity device 400. As shown in block 566, the data manager writes the Nth previous key to overflow memory 518 so that the overflow memory preferably (although not required) only contains the subset of key history data not contained on the limited capacity device. Since only the key that has been overwritten is sent to the data manager and stored on the overflow memory, minimal communication overhead and data is processed.

It should be understood that the implementation of other variations and modifications of the invention in its various aspects will be apparent to those of ordinary skill in the art, and that the invention is not limited by the specific embodiments described. For example, the data generator and or the updated key history provider may be on the same unit as the data manager. It is therefore contemplated to cover by the present invention, any and all modifications, variations, or equivalents that fall within the spirit and scope of the basic underlying principles disclosed and claimed herein.

What is claimed is:

1. Data management system for interfacing to a portable limited capacity cryptographic storage unit comprising:
    a cryptographic data manager adapted to the portable limited capacity cryptographic storage unit; and
    a data overflow storage device, operatively coupled to the cryptographic data manager,
    wherein the cryptographic data manager stores cryptographic data from the limited capacity storage unit in the data overflow storage device based on a limited capacity storage unit update condition.

2. The data management system of claim 1 wherein the cryptographic data manager determines the limited capacity storage unit data update condition and bases the decision on a determination of a data overflow condition for the limited capacity storage unit.

3. The data management system of claim 1 wherein the limited capacity storage unit data update condition is a condition where new data is to be stored in the limited capacity cryptographic storage unit.

4. The data management system of claim 1 wherein the cryptographic data manager manages decryption private key storage between the portable limited capacity storage unit and the data overflow storage device.

5. The data management system of claim 1 wherein the cryptographic data manager stores decryption private key history data in the data overflow storage device in response to generation of a new decryption private key.

6. The data management system of claim 1 including an encryption key pair generator, operatively coupled to the cryptographic data manager.

7. The data management system of claim 1 wherein the limited capacity cryptographic storage unit stores redundant cryptographic data.

8. The data management system of claim 1 wherein the data overflow storage device stores cryptographic data from the limited capacity cryptographic storage unit and wherein the limited capacity cryptographic storage unit stores non-redundant cryptographic data.

9. The data management system of claim 1 wherein the data over flow storage device stores decryption private key history data obtained from the limited capacity cryptographic storage unit and wherein the limited capacity cryptographic storage unit also stores decryption private key history data.

10. The data management system of claim 9 wherein the data overflow storage device and the limited capacity cryptographic storage unit store redundant decryption private key history data.

11. The data management system of claim 9 wherein the data overflow storage device and the limited capacity cryptographic storage unit store non-redundant decryption private key history data.

12. The data management system of claim 1 wherein the cryptographic data manager includes:
   a data router operatively coupled to receive new data for storage in the limited capacity cryptographic storage unit, and
   an encryptor/decryptor operatively coupled to the data router,
   wherein the data router routes the new data to the limited capacity cryptographic storage unit and wherein the encryptor encrypts data sent to the overflow storage unit and the decryptor decrypts the new data prior to being stored in the limited capacity cryptographic storage unit.

13. The data management system of claim 1 wherein the limited capacity cryptographic storage unit stores first cryptographic key identification data and wherein the overflow storage unit stores second cryptographic key identification data.

14. The data management system of claim 13 including a selector, operatively responsive to the first and second cryptographic key identification data, that selects stored cryptographic data from either the limited capacity cryptographic storage unit or from the overflow storage unit, based on the identification data.

15. The data management system of claim 14 including a data decryptor, operatively coupled to the selector, wherein the data decryptor decrypts received encrypted data using the selected stored cryptographic data.

16. The data management system of claim 15 wherein cryptographic data includes decryption private key data and wherein the limited capacity cryptographic data storage unit and overflow unit includes decryption private key history data to facilitate decryption of received data encrypted using a non-current public encryption key.

17. The data management system of claim 12 wherein the encryptor encrypts key data from the data router using a symmetric key stored in the limited capacity cryptographic data storage unit.

18. The data management system of claim 17 wherein the key data includes decryption private key data removed from the limited capacity cryptographic storage unit.

19. The data management system of claim 12 wherein the encryptor encrypts key data from the data router using a symmetric key.

20. The data management system of claim 1 wherein the cryptographic data manager temporarily stores new data to be stored in the limited capacity cryptographic data storage unit until sufficient space is available in the limited capacity cryptographic data storage unit.

21. The data management system of claim 1 wherein the cryptographic data is latest previous decryption key history data.

22. The data management system of claim 1 wherein the cryptographic data is Nth previous cryptographic data from a stored history of cryptographic data, where N is a number of cryptographic keys stored by the limited capacity cryptographic storage unit.

23. The data management system of claim 1 wherein the limited capacity cryptographic storage unit stores cryptographic data in a first in first out (FIFO) manner.

24. The data management system of claim 23 wherein the cryptographic data manager provides memory size data of the limited capacity cryptographic storage unit for a primary key history data manager.

25. The data management system of claim 24 wherein the primary key history data manager obtains at least one of a plurality of non-current decryption private keys based on the memory data.

26. Data management system for interfacing to a portable limited capacity cryptographic storage unit comprising:
   a receiver other than the portable limited capacity cryptographic storage unit that receives new data for storage in the portable limited capacity cryptographic storage unit; and
   a data router operatively coupled to the receiver wherein the data router routes cryptographic data to a data overflow storage device based on a portable limited capacity storage unit data update condition.

27. The data management system of claim 26 including the data overflow storage device, operatively coupled to the data router.

28. The data management system of claim 26 wherein the limited capacity storage unit data update condition is a condition where new data is to be stored in the limited capacity cryptographic storage unit.

29. The data management system of claim 26 wherein the cryptographic data manager manages decryption private key storage among the limited capacity storage unit and the data overflow storage device.

30. The data management system of claim 26 wherein the cryptographic data manager stores decryption private key history data in the data overflow storage device in response to generation of a new decryption private key.

31. The data management system of claim 26 including an encryption key pair generator, operatively coupled to the cryptographic data manager.

32. The data management system of claim 27 wherein the data overflow unit stores decryption private key history data obtained from the limited capacity cryptographic storage unit and wherein the limited capacity cryptographic storage unit also stores decryption private key history data.

33. The data management system of claim 26 wherein the cryptographic data manager includes:
   an encryptor/decryptor operatively coupled to the data router,
   wherein the data router routes the new data to the limited capacity cryptographic storage unit and wherein the encryptor encrypts data sent to the overflow storage unit and the decryptor decrypts the new data prior to being stored in the limited capacity cryptographic storage unit.

34. The data management system of claim 26 wherein the limited capacity cryptographic storage unit stores first decryption private key identification data and wherein the overflow storage unit stores second decryption private key identification data.

35. The data management system of claim 34 including a selector, operatively responsive to the first and second decryption private key identification data, that selects stored cryptographic data from either the limited capacity cryptographic storage unit or from the overflow storage unit, based on the identification data.

36. The data management system of claim 35 including a data decryptor, operatively coupled to the selector, wherein the data decryptor decrypts received encrypted data using the selected stored cryptographic data.

37. The data management system of claim 36 wherein cryptographic data includes decryption private key data and wherein the limited capacity cryptographic data storage unit and overflow unit includes decryption private key history data to facilitate decryption of received data encrypted using a non-current public encryption key.

38. The data management system of claim 33 wherein the encryptor encrypts key data from the data router using a symmetric key stored in the limited capacity cryptographic data storage unit.

39. Data management system for interfacing to a portable limited capacity cryptographic storage unit comprising:

a receiver other than the portable limited capacity cryptographic storage unit that receives new data for storage in the portable limited capacity cryptographic storage unit;

a data router operatively coupled to the receiver wherein the data router routes cryptographic data to a data overflow storage device based on a portable limited capacity storage unit data update condition; and a primary key history data manager, operatively coupled to the receiver, that provides new cryptographic key data to the receiver for storage on the limited capacity cryptographic storage unit and maintains a decryption key history associated with a given portable limited capacity cryptographic storage unit.

40. The data management system of claim 39 wherein the data router provides memory size data of the limited capacity cryptographic storage unit for the primary key history data manager and wherein the primary key history data manager sends at least one non-current decryption key to the receiver in response thereto.

41. Data management method for interfacing to a portable limited capacity cryptographic storage unit comprising the steps of:

determining a portable limited capacity storage unit data update condition; and storing cryptographic data in the data overflow storage device received from the portable limited capacity cryptographic storage unit based on the portable limited capacity storage unit data update condition.

42. The data management method of claim 41 wherein determining the limited capacity storage unit data update condition includes determining a data overflow condition for the limited capacity storage unit.

43. The data management method of claim 41 including managing decryption private key storage among the limited capacity storage unit and the data overflow storage device.

44. The data management method of claim 41 including storing decryption private key history data in the data overflow storage device in response to generation of a new decryption private key.

45. The data management method of claim 41 including storing cryptographic data from the limited capacity cryptographic storage unit and wherein the limited capacity cryptographic storage unit stores non-redundant cryptographic data.

46. The data management method of claim 41 including the steps of:

receiving new data for storage in the limited capacity cryptographic storage unit, routing the new data to the limited capacity cryptographic storage unit encrypting data sent to an overflow storage unit; and decrypting the new data prior to being stored in the limited capacity cryptographic storage unit.

47. The data management method of claim 41 including selecting stored cryptographic data from either the limited capacity cryptographic storage unit or from the overflow storage unit, based on key identification data.

48. Data management method for a limited capacity cryptographic storage unit comprising:

receiving new data for storage in the limited capacity cryptographic storage unit;

routing cryptographic data to a data overflow storage device based on a limited capacity storage unit data update condition;

providing new cryptographic key data to the receiver for storage on the limited capacity cryptographic storage unit; and maintaining a decryption key history associated with a given limited capacity cryptographic storage unit.

49. The data management method of claim 48 including providing memory size data of the limited capacity cryptographic storage unit for a primary key history data manager and wherein the primary key history data manager sends at least one non-current decryption key to the receiver in response thereto.

* * * * *